United States Patent [19]

Benedict et al.

[11] Patent Number: 5,585,128
[45] Date of Patent: Dec. 17, 1996

[54] PROCESS FOR THE PREPARATION OF STABLE WHITE GRAPE JUICE

[75] Inventors: Lewis W. Benedict, Northeast, Pa.; Donald A. Fritz, Westfield, N.Y.

[73] Assignee: Welch Foods Inc., Concord, Mass.

[21] Appl. No.: 475,541

[22] Filed: Jun. 7, 1995

[51] Int. Cl.$^6$ .................... A23L 2/46; A23L 2/52
[52] U.S. Cl. ............ 426/330.5; 426/521; 426/547; 426/599
[58] Field of Search ............... 426/599, 330.5, 426/547, 521

[56] References Cited

U.S. PATENT DOCUMENTS

| | | |
|---|---|---|
| 1,305,244 | 6/1919 | Bacon . |
| 2,500,670 | 3/1950 | Dunkley . |
| 2,955,943 | 10/1960 | Morgan, Jr. et al. . |
| 4,259,360 | 3/1981 | Venetucci et al. . |
| 4,374,714 | 2/1983 | Hekal . |
| 4,766,001 | 8/1988 | Mizandjian et al. . |
| 4,915,967 | 4/1990 | Nozaka . |
| 4,996,073 | 2/1991 | Copeland et al. . |
| 5,021,251 | 6/1991 | McKenna et al. . |
| 5,468,508 | 11/1995 | Wu et al. ............... 426/599 |

FOREIGN PATENT DOCUMENTS 207039  12/1986  European Pat. Off. .

OTHER PUBLICATIONS

Varnum, A. 1994, Beverages, Chapman & Hall, N.Y., pp. 44–49, 54.
Ashurst et al. 1995, Production and Packaging of Non-Carbonated Fruit Juices and Beverages, pp. 92–95, 98–102.
CA113(21):189719q, Japan.
CA112:117578, Germany.

*Primary Examiner*—Helen Pratt
*Attorney, Agent, or Firm*—Finnegan, Henderson, Farabow, Garrett & Dunner, L.L.P.

[57] ABSTRACT

A process for the preparation of a non-citric fruit juice, particularly white grape juice, in the absence of sulfites, including the steps of cold pressing, filtering the juice obtained from pressing, holding the juice in the absence of sulfites, heat treating the juice for a time and at a temperature sufficient to eliminate microbiological and enzymatic activity; and cooling the heat treated juice is described. The process can also include sparging with sufficient nitrogen to achieve < 5 ppm dissolved oxygen.

19 Claims, No Drawings

PROCESS FOR THE PREPARATION OF STABLE WHITE GRAPE JUICE

BACKGROUND OF INVENTION

1. Field of Invention

The present invention relates to a process for the preparation of stable white grape juice. More particularly, the invention relates to a process which precludes the use of sulfites, thereby allowing enzymatic browning to proceed. The invention additionally relates to a process in which nitrogen sparging is used to control oxidation of the white grape juice produced according to the claimed process. The invention further relates to a process in which the white grape juice is stored aseptically.

2. Description of Related Art

White grape juice as currently manufactured comprises juice from white grapes of the *V. labrusca* species and *V. vinifera* species, such as, but not limited to, the hybrid Niagara, and the Thompson Seedless, French Collombard, and Muscat varieties. While commercial white grape juice can be produced from a single variety of grapes, blends are often employed to take advantage of the most desirable attributes of two or more varieties. For example, attributes such as sweetness, tartness, color, flavor, astringency, and viscosity vary significantly among different varieties of white grapes. By blending juices, one may achieve a finished white grape juice product with organoleptic characteristics superior to those found in white grape juice prepared from a single grape variety.

Conventional manufacturing processes employed in the commercial production of white grape juice require the addition and maintenance of efficacious levels of a sulfiting agent such as potassium metabisulfite to grapes and grape juice throughout harvest, pressing, and subsequent stages of manufacturing. The purpose of sulfite use is to inhibit degradation of color and flavor caused by classical enzymatic, non-enzymatic, and oxidative reactions. Such reactions are commonly associated with fruit and fruit juice browning. White grape juices are especially prone to loss of quality when not sulfited. In addition to sulfites, stabilizers or preservatives such as ascorbic acid and its salts, erythorbic acid and its salts, L-cysteine, and poly(vinyl-polypyrrolidone) have also been added in an attempt to preserve color and flavor.

Enzymatic browning is the result of the reaction of naturally occurring phenolase enzymes and juice substrates in the presence of oxygen. Non-enzymatic browning mechanisms include such well-known phenomena as caramelization of natural sugars, decomposition of ascorbic acid, and the Maillard Reaction.

In the typical processes of the prior art, a solution of potassium metabisulfite, hereafter referred to as sulfite, is added to the grapes during the mechanical harvesting of the grapes as each one-ton receptacle or bin is filled. Sufficient sulfite is added to achieve 200–300 parts per million (ppm) of $SO_2$ in the mixture of grapes and free-run grape juice as delivered from the mechanical harvester to each bin.

The bins of sulfited grapes are covered and transported to a processing facility for pressing. Upon delivery to the processing facility, grapes are dumped and prepared for pressing by first removing stems and by crushing to facilitate juice removal.

The process of preparation and of pressing white grapes and filtration of grape juice prior to pasteurization is commonly referred to as "cold-pressing" and is typically carried out at ambient temperatures ranging from 50°–90° F. without employing pectinase enzymes and heat. A modification of the cold-pressing process employs pectinase enzyme or warming of grapes above 80° F. but less than 100° F. to facilitate juice expression.

De-stemmed grapes and juice are placed in holding kettles where additional sulfite is added to restore the $SO_2$ level to 150 ppm to further protect against enzymatic browning. Cellulose fiber or rice hulls are also added to the sulfited slurry as pressing aids. This slurry is then passed over drag screens to remove free-run juice with the remaining pulps and cellulose fiber or rice hulls being sent separately to mechanical presses for juice expression.

Free-run juice from the screening process is merged with the juice stream from the presses, combined with additional cellulose fiber, and vacuum-filtered to remove a major fraction of insoluble substances.

Just before pasteurization, additional sulfite is added to ensure maintenance of $SO_2$ levels of 150–200 ppm in the pasteurized juice after it reaches the storage tank.

To ensure microbiological stability in the storage tank, filtered, sulfited white grape juice is pasteurized, or heat-treated, at 185°–192° F., cooled to 30°–32° F., and pumped to temperature controlled (30°–32° F.) storage tanks where it is treated with pectinase and amylase enzymes for clarification. This is followed by a gradual settling of bitartrates (argols) and insoluble substances over a 1–2 month period.

After clarification and settling has been achieved, clear juice is drawn from storage tanks, blended with white grape juice from concentrate and sufficient sulfite is added to achieve 75–105 ppm $SO_2$ in the finished, bottled white grape juice product. The juice blend is pasteurized, bottled or canned, cooled, and stored at ambient temperature for distribution and consumption.

Typical shelf-life for bottled or canned white grape juice which has been sulfited at 75–105 ppm $SO_2$ ranges from 9–12 months. Without sulfites, severe loss of flavor and browning occur, rendering white grape juice organoleptically unsuitable for commercial use after only 1–3 months at ambient temperature.

For many potential consumers, the presence of sulfites in white grape juice is unacceptable. Substitutes for sulfites have been the subject of extensive research in the scientific community. No suitable chemical alternative has been identified for fruit juices. Although several moderately successful chemical preservatives have been found useful in other foods, these have not been satisfactory substitutes for sulfites in juices and wines.

A search for alternatives to sulfites has led the present inventors to the development of a unique process for the preparation of commercial white grape juice. In one embodiment, the presently claimed process precludes the use of sulfites, thus allowing natural enzymatic browning to proceed. In yet another embodiment, dissolved oxygen in the product is controlled through nitrogen sparging. In a further embodiment, microbiological degradation is controlled by aseptic storage of the processed juice. The resulting finished bottled or canned white grape juice has a distinctive fruity character and is generally darker in color than sulfited white grape juice. The product prepared by this new process exhibits organoleptic stability up to 12 months at ambient temperature, resulting in a commercially acceptable product.

In yet another optional embodiment, very low levels of sulfites may be added just prior to or after heat treatment to obtain 30 ppm or less sulfites in the stored juice.

SUMMARY OF INVENTION

To achieve these and other advantages, and in accordance with the purpose of the invention as embodied and broadly described herein, the present invention is directed to a process for the preparation of stable white grape juice in the absence of sulfites. Enzymatic browning, when allowed to proceed unimpeded by sulfites throughout the harvest, pressing, and filtration process, will effect removal of precursors to non-enzymatic browning during the filtration process. The result is white grape juice with significantly enhanced color and flavor stability after the primary juice is formulated and processed into a finished white grape juice product without the addition of sulfites. This process is equally suitable for the grapes of individual species such as *V. labrusca* and *V. vinifera*, for hybrids of *V. labrusca*-*V. vinifera* such as the Niagara grape and for blends of *V. labrusca* and *V. vinifera* juices.

The presently claimed process can be practiced to preclude the use of sulfites entirely as described below.

A first embodiment of the present invention is a process including the steps of cold pressing grapes of a white variety at a temperature of 50°–90° F. in the absence of sulfites followed by heat-treatment for a time and at a temperature sufficient to eliminate microbiological and enzymatic activity. The heat-treated juice is then cooled below 100° F. and clarified by addition of pectinase or pectinase and amylase enzymes. Alternately, pectinase can be added to the juice followed by the addition of gelatin. The clarified juice is then mixed with an agent such as diatomaceous earth to facilitate the removal of insoluble substances and the juice is then filtered. The filtered juice is then again heat-treated for a time and at a temperature sufficient to eliminate microbiological and enzymatic activity. Finally, the heated juice is cooled to less than 100° F. and stored at ambient temperature.

Storage of the juice can be accomplished by pouring the hot juice into glass bottles or any other suitable container ("hot-filling") followed by cooling and storage. Alternatively, the juice can first be cooled to less than 100° F. and aseptically stored for later packaging.

In another embodiment, the present invention relates to a process for preparing white grape juice which includes cold pressing grapes of a white variety at a temperature of 50°–90° F. in the absence of sulfites, filtering the juice obtained from pressing, and holding the juice in the absence of sulfites. Subsequent steps comprise sparging the juice with sufficient nitrogen to achieve < 5 ppm dissolved oxygen; heat treating the juice for a time and at a temperature sufficient to eliminate microbiological and enzymatic activity; cooling the heat treated juice to 28°–50° F.; and storing the juice in sterilized tanks with nitrogen atmosphere at 28°–50° F. prior to bottling.

In a third embodiment of the process of the present invention, sparging occurs after heat treatment. As above, the process includes the steps of cold pressing white grapes at a temperature of 50°–90° F. in the absence of sulfites, filtering the juice obtained from pressing, and holding the juice in the absence of sulfites. The juice is next heat treated for a time and at a temperature sufficient to eliminate microbiological and enzymatic activity. The heat treated juice is cooled to 28°–50° F. and sparged with sufficient nitrogen to achieve < 5 ppm dissolved oxygen. Sparging heads are located in the lines through which the juice is pumped. Finally, the juice is stored in sterilized tanks with nitrogen atmosphere at 28°–50° F. prior to bottling.

Additionally and optionally, $SO_2$ may be added just prior to or after pasteurization of the juices for increased stability in the storage tank, but at levels sufficiently low to preclude detection in finished, commercial white grape juice.

Finally, the present invention is also drawn to a process for preparing non-citric fruit juice. This process includes the steps of cold pressing a non-citric fruit in the absence of sulfites; filtering the juice obtained from pressing, and holding the juice in the absence of sulfites. The juice is then heat treated for a time and at a temperature sufficient to eliminate microbiological and enzymatic activity. The heat treated juice is cooled to 28°–50° F. prior to or following sparging with sufficient nitrogen to achieve < 5 ppm dissolved oxygen and the juice is stored in sterilized tanks with nitrogen atmosphere at 28°–50° F. prior to bottling.

The above and other advantages and features of this invention will become apparent upon review of the following detailed description.

DETAILED DESCRIPTION OF PREFERRED EMBODIMENTS

The present invention relates to a process for preparing white grape juice. White grapes are harvested, delivered, pressed, and filtered in the same manner as required for conventional cold pressing, but without the addition of sulfites. Enzymatic browning is thereby allowed to proceed. The browning phenomenon is observable throughout the preparation, pressing, and filtration stages of the process. As in the conventional process, the temperature range is maintained within a range of 50°–90° F., preferably 60°–85° F.

One embodiment of the present invention is a process which includes the steps of cold pressing grapes of a white variety at a temperature of 50°–90° F. in the absence of sulfites followed by heat treatment of the juice for a time and at a temperature sufficient to eliminate microbiological and enzymatic activity. The heat-treated juice is then cooled below 100° F., clarified by the addition of pectinase or pectinase and amylase, mixed with an agent such as diatomaceous earth, and then filtered. The twice-filtered juice is then heat-treated a second time for a time and at a temperature sufficient to eliminate microbiological and enzymatic activity. Finally, the heated juice is poured into glass bottles, which are stored at ambient temperature. No sparging step is included in this embodiment.

In another embodiment, the present invention relates to a process for preparing white grape juice which includes cold pressing grapes of a white variety at a temperature of 50°–90° F., preferably 60°–85° F., in the absence of sulfites; filtering the juice obtained from pressing, and holding the juice in the absence of sulfites. The juice is then sparged with sufficient nitrogen to achieve < 5 ppm, preferably < 1 ppm, dissolved oxygen. After sparging, subsequent process steps comprise heat treating the juice for a time and at a temperature sufficient to eliminate microbiological and enzymatic activity, preferably 185°–192° F. for 30 seconds; cooling the heat treated juice to 28°–50° F., preferably 28°–36° F.; and storing the juice in sterilized tanks with nitrogen atmosphere at 28°–50° F., preferably 28°–36° F., prior to bottling.

A third embodiment of the instantly claimed process includes the steps of cold pressing grapes of a white variety at a temperature of 50°–90° F., preferably 60°–85° F., in the absence of sulfites; filtering the juice obtained from pressing, and holding the juice in the absence of sulfites. The juice is then heat treated for a time and at a temperature sufficient to eliminate microbiological and enzymatic activity. The juice is preferably heat treated at 185°–192° F. and preferably for 30 seconds. The heat treated juice is then cooled to 28°–50° F., preferably 28°–36° F., prior to sparging with sufficient nitrogen to achieve < 5 ppm, preferably < 1 ppm, dissolved oxygen. Sparging is achieved by pumping the cooled juice through lines fitted with sintered metal nitrogen sparging heads. Nitrogen is introduced by finely dispersing the gas through the sparging heads into the juice stream for the purpose of displacing dissolved oxygen, achieving < 5 ppm, preferably < 1 ppm, dissolved oxygen in the stored juice.

The juice is stored in sterilized tanks with nitrogen atmosphere at 28°–50° F., preferably 28°–36° F., prior to bottling. Optionally, the sterilized tank is an aseptic tank, employed to minimize the potential for microbial spoilage.

Removal of dissolved oxygen is necessary to preservation of grape flavor of the juice which is prone to oxidation. A low level of sulfites will assist in scavenging trace amounts of dissolved oxygen, but is not necessary provided that the nitrogen sparging of the claimed process achieves < 5 ppm, preferably < 1 ppm, dissolved oxygen.

If it is desirable to add low levels of sulfite for increased stability in storage, addition is made just prior to or following heat treatment to obtain 30 ppm or less sulfites in the stored juice.

Chemical and/or heat sterilization of processing and storage equipment following heat treatment of the newly pressed juice is important to microbiological stability of juice in storage tanks. Where nitrogen sparging follows pasteurization, additional precautions are taken, which include sub-micro-filtration of sparging nitrogen and sterilization of nitrogen feed lines leading to in-line sparging heads.

Treatment with pectinase and amylase enzymes for juice clarification generally follows the same procedure described for the conventional process but includes micro-filtration of enzyme solutions during enzyme addition to prevent the introduction of microbiological organisms. Micro-filtered pectinase or amylase enzymes are added to the stored juice in an amount sufficient to clarify the juice.

Processing of finished bottled or canned juice produced by the processes of the claimed invention is similar to the conventional process, but is accomplished without the addition of sulfites. White grape juice prepared by the claimed method exhibits organoleptic stability for up to twelve months at ambient temperatures as shown in the table of Example 1.

Another embodiment of the present invention is drawn to a process for preparing non-citric fruit juice. Preferably, the juice is white grape or apple juice. The claimed process includes the steps of cold pressing a non-citric fruit in the absence of sulfites; filtering the juice obtained from pressing, and holding the juice in the absence of sulfites; heat treating the juice for a time and at a temperature sufficient to eliminate microbiological and enzymatic activity, preferably at 185°–192° F. for 30 sec; cooling the heat treated juice to 28°–50° F., preferably 28°–36° F., prior to or following sparging with sufficient nitrogen to achieve < 5 ppm, preferably < 1 ppm, dissolved oxygen; and storing the juice in sterilized tanks with nitrogen atmosphere at 28°–50° F., preferably 28°–36° F., prior to bottling. Optionally, the sterilized tank is an aseptic tank.

The non-citric fruit is preferably pressed at a temperature of 50° to 90° F. Sulfites may be added to the juice just prior to or following heat treatment to obtain 30 ppm or less sulfites in the stored juice. Alternatively, a micro-filtered solution of sulfites may be added directly to the stored juice to achieve 30 ppm or less sulfites in the stored juice.

Micro-filtered pectinase or amylase enzymes may be added to the juice obtained from pressing, or directly to the stored juice in an amount sufficient to clarify the juice.

Non-sulfited juice of non-citric fruits which has already been pressed can be prepared using the claimed process, starting with the filtering step.

The present invention is illustrated by way of the following examples. It is to be understood that the invention is not to be limited to the specific conditions or details set forth in these examples except insofar as such limitations are specified in the appended claims.

EXAMPLE 1

One hundred pounds of white grapes of the Niagara variety were harvested and prepared for pressing in the absence of sulfites. The grapes were cold-pressed at ambient temperature by means of a Buffalo continuous screen press, available from Buffalo Hammer Mill Corporation of Buffalo, N.Y. The expressed juice was flash pasteurized at 185°–190° F. for about 30 seconds by means of a custom-made tubular heat exchanger to eliminate microbiological and enzymatic activity and cooled to <100° F. The juice was treated with pectinase and amylase enzymes and allowed to settle clear prior to blending with *V. vinifera* grape juice from concentrate. Sufficient ascorbic acid was added for nutritional purposes to achieve 45% RDA of Vitamin C in the finished juice blend. The juice blend was mixed with JM-503 diatomaceous earth, available from Johns Manville of Toledo, Ohio, and filtered by means of a Shriver plate and frame filter, manufactured by T. Shriver Company of Harrison, N.J. The filtered juice blend was flash pasteurized at 185°–190° F. for about thirty seconds, hot-filled into 24 oz glass bottles, stored at ambient temperature, and evaluated over a twelve month period.

White grape juice prepared by the claimed method for processing without nitrogen sparging exhibited organoleptic stability for up to twelve months. Color measurement by means of a Spectronic 70 spectrophotometer, available from Bausch and Lomb of Rochester, N.Y., showed that color values of the bottled white grape blend at corrected absorbance (CA) 430 nm increased over a period of twelve months at ambient temperature but remained within an acceptable range of color. Color acceptability was confirmed by visual observation. Flavor by subjective evaluation was found to be acceptable up to twelve months.

|  | COLOR CA 430 nm | | VISUAL COLOR | | FLAVOR |
| --- | --- | --- | --- | --- | --- |
| Months at Ambient Temperature | Sulfited Juice Blend | Unsulfited Juice Blend | Sulfited Juice Blend | Unsulfited Juice Blend | Unsulfited Juice Blend |
| 0 | Control 0.16 | Reference Standard | Control | Reference Standard | Reference Standard |

-continued

| Months at Ambient Temperature | COLOR CA 430 nm | | VISUAL COLOR | | FLAVOR |
|---|---|---|---|---|---|
| | Sulfited Juice Blend | Unsulfited Juice Blend | Sulfited Juice Blend | Unsulfited Juice Blend | Unsulfited Juice Blend |
| | | 0.22 | | | Fruity, Apple-like |
| 3 | 0.16 | 0.28 | Acceptable | Acceptable vs Reference Standard | Acceptable vs Reference Standard |
| 6 | 0.17 | 0.28 | Acceptable | Acceptable vs Reference Standard | Acceptable vs Reference Standard |
| 9 | 0.18 | 0.32 | Acceptable | Acceptable vs Reference Standard | Acceptable vs Reference Standard |
| 12 | 0.18 | 0.38 | Acceptable | Acceptable* vs Reference Standard | Acceptable fruity, Honey-like, absence of raisin character |

*The internal standard used by applicants for acceptable color is 0.40

EXAMPLE 2

Eight hundred tons of white grapes of the variety Niagara were harvested and prepared for pressing in the absence of sulfites. The grapes were cold-pressed at ambient temperature using a Garolla continuous screw press. The expressed grape juice was filtered by means of an EIMCO rotary belt vacuum filter, available from EIMCO Processing Equipment Co. of Salt Lake City, Utah, and sparged with nitrogen by pumping the juice through a line fitted with a 3-inch sintered metal gas sparging head, available from Liquid Carbonic of Canton, Ohio, just before heat pasteurization. Nitrogen was introduced into the juice stream at the rate of 2705 standard cubic feet per hour to achieve < 5 ppm dissolved oxygen in juice at the storage bank. Dissolved oxygen is measured by means of an YSI model 50-B dissolved oxygen meter, available from Yellow Springs Instruments, Inc. of Yellow Springs, Ohio. The nitrogen sparged juice was pasteurized at 191° F. for 30 seconds and cooled to 31° F. by means of an APV R-55 heat exchanger, available from APV Crepaco of Tonawanda, N.Y., to eliminate microbiological and enzymatic activity. The pasteurized and cooled juice was stored in a sterilized aseptic bulk storage tank (designed by Fran Rica of Stockton, Calif.) at 30° F. in the absence of sulfites and with a nitrogen atmosphere of 1 psi.

EXAMPLE 3

The procedure of Example 2 is employed except that nitrogen sparging occurs after pasteurization and the process includes micro-filtration of sparging nitrogen and sterilization of nitrogen feed lines leading to in-line sparging heads.

EXAMPLE 4

Apples are macerated at 30°–90° F. by means of a hammer mill. The macerated apples are mixed with cellulose fiber or rice hulls and cold-pressed at 30°–90° F. in the absence of sulfites by means of a pneumatic, continuous screw, bladder or other suitable press. The juice is combined with cellulose fiber and filtered by means of a rotary belt vacuum filter. The filtered juice is sparged with nitrogen by pumping the juice through a line fitted with a sintered metal gas sparging head. Nitrogen is introduced into the juice stream at a rate sufficient to achieve < 5 ppm, preferably < 1 ppm, dissolved oxygen in the juice at the storage tank. Dissolved oxygen is measured by a YSI model 50-B oxygen meter. The nitrogen sparged juice is pasteurized at 185°–192° F. for 30 seconds and cooled to 28°–50° F., preferably 28°–36° F., by means of a heat exchanger to eliminate microbiological and enzymatic activity. The pasteurized and cooled juice is stored up until the time of bottling in sterilized or aseptic tanks at 28°–50° F., preferably 28°–36° F., with a nitrogen atmosphere of 1 psi.

EXAMPLE 5

The process of Example 4 is followed except that the nitrogen sparging takes place following heat-treatment of the juice. The process includes a micro-filtration of sparging nitrogen and sterilization of nitrogen feed lines leading to in-line sparging tanks.

EXAMPLE 6

The apples are macerated and pressed as in Example 4. The pressed juice is then filtered. The filtered juice is heat-treated, cooled, and nitrogen sparged under the same conditions as in Example 4. The cooled juice is stored in tanks as in Example 4. At least one micro-filtered enzyme is then added to the juice in the storage tank for clarification.

It will be apparent to those skilled in the art that various modifications and variations can be made in the composition and method of the invention without departing from the spirit or scope of the invention. Thus, it is intended that the present invention cover the modifications and variations of this invention provided that they come within the scope of the appended claims and their equivalents.

What is claimed is:

1. A process for preparing white grape juice comprising the steps of a) cold pressing grapes of a white variety at a temperature of 50°–90° F. in the absence of sulfites;

b) heat treating said juice for a time and at a temperature sufficient to eliminate microbiological and enzymatic activity;

c) cooling the heat treated juice to less than 100° F;

d) clarifying the cooled juice;

e) mixing said juice with an agent to remove insoluble substances and then filtering the mixture;

f) again heat treating said juice for a time and at a temperature sufficient to eliminate microbiological and enzymatic activity;

g) pouring the heat-treated juice into a suitable storage container; and h) cooling the juice to less than 100° F. and storing at ambient temperature, wherein said white grape juice exhibits a color of up to about 0.40 ca at 430 nm.

2. A process for preparing white grape juice comprising the steps of a) cold pressing grapes of a white variety at a temperature of 50°–90° F. in the absence of sulfites;

b) filtering the juice obtained in step a) and holding the juice in the absence of sulfites;

c) sparging the juice with sufficient nitrogen to achieve < 5 ppm dissolved oxygen;

d) heat treating said juice for a time and at a temperature sufficient to eliminate microbiological and enzymatic activity;

e) cooling the heat treated juice to 28°–50° F.; and f) storing the juice in sterilized tanks with nitrogen atmosphere at 28°–50° F. prior to bottling, wherein said white grape juice exhibits a color of up to about 0.40 ca at 430 nm.

3. A process for preparing white grape juice comprising the steps of a) cold pressing grapes of a white variety at a temperature of 50°–90° F. in the absence of sulfites;

b) filtering the juice obtained in step a) and holding the juice in the absence of sulfites;

c) heat treating said juice for a time and at a temperature sufficient to eliminate microbiological and enzymatic activity;

d) cooling the heat treated juice to 28°–50° F. prior to sparging with sufficient nitrogen to achieve < 5 ppm dissolved oxygen; and e) storing the juice in sterilized tanks with nitrogen atmosphere at 28°–50° F. prior to bottling, wherein said white grape juice exhibits a color of up to about 0.40 ca at 430 nm.

4. The process of claim 2, step f) or claim 3, step e) wherein storage occurs in an aseptic tank.

5. The process of claim 2, step e) or claim 3, step d), wherein the heat treated juice is cooled to 28°–36° F.

6. The process according to claim 2, step d) or claim 3, step c) wherein the juice is heat treated at 185°–192° F. for about 30 seconds.

7. The process of claim 2 or claim 3 further comprising adding micro-filtered pectinase or amylase enzymes to the stored juice in an amount sufficient to clarify the juice.

8. The process according to claim 2, step c) or claim 3, step d) wherein < 1 ppm of dissolved oxygen is achieved.

9. The processes of claims 1, 2, or 3 wherein sulfites may be added to the juice just prior to or following heat treatment to obtain 30 ppm or less sulfites in the stored juice.

10. White grape juice prepared without the use of sulfites, wherein said white grape juice exhibits a color of up to about 0.40 ca at 430 nm.

11. A process for preparing non-citric fruit juice comprising the steps of a) cold pressing a non-citric fruit in the absence of sulfites;

b) filtering the juice obtained in step a) and holding the juice in the absence of sulfites;

c) heat treating said juice for a time and at a temperature sufficient to eliminate microbiological and enzymatic activity;

d) cooling the heat treated juice to 28°–50° F. prior to or following sparing with sufficient nitrogen to achieve <5 ppm dissolved oxygen; and e) storing the juice in sterilized tanks with nitrogen atmosphere at 28°–50° F. prior to bottling, wherein said non-citric fruit juice exhibits a maximum color increase during storage of 0.2 at 430 nm.

12. The process of claim 11 wherein step e) occurs in an aseptic tank.

13. The process of claim 11 further comprising adding micro-filtered pectinase or amylase enzymes to step (a) or step (e) in an amount sufficient to clarify the juice.

14. The process of claim 11 wherein the non-citric fruit is pressed at a temperature of 50 to 90° F.

15. The process of claim 11, step d), wherein the heat treated juice is cooled to 28°–36° F.

16. A process for preparing already pressed non-sulfited non-citric fruit juice comprising the steps b) to e) of claim 11.

17. The process of claim 11 further comprising adding sulfites to the juice just prior to or following heat treatment to obtain 30 ppm or less sulfites in the stored juice.

18. The process of claim 11 further comprising adding a micro-filtered solution of sulfites directly to the stored juice to achieve 30 ppm or less sulfites in the stored juice.

19. Apple juice prepared by the process of claim 11.

* * * * *

UNITED STATES PATENT AND TRADEMARK OFFICE
CERTIFICATE OF CORRECTION

PATENT NO. : 5,585,128
DATED : December 17, 1996
INVENTOR(S) : BENEDICT et al.

It is certified that error appears in the above-indentified patent and that said Letters Patent is hereby corrected as shown below:

On the title page, and Col. 1, line 3:

change "WHITE GRAPE" to read

--NON-CITRATE FRUIT--.

Signed and Sealed this

Eleventh Day of March, 1997

*Attest:*

BRUCE LEHMAN

*Attesting Officer*     *Commissioner of Patents and Trademarks*